United States Patent
Nagaoka et al.

(10) Patent No.: US 8,341,943 B2
(45) Date of Patent: Jan. 1, 2013

(54) EXHAUST GAS PURIFICATION METHOD AND EXHAUST GAS PURIFICATION SYSTEM

(75) Inventors: Daiji Nagaoka, Fujisawa (JP); Masashi Gabe, Fujisawa (JP)

(73) Assignee: Isuzu Motors Limited, Tokyo (JP)

(*) Notice: Subject to any disclaimer, the term of this patent is extended or adjusted under 35 U.S.C. 154(b) by 751 days.

(21) Appl. No.: 11/919,929

(22) PCT Filed: Apr. 24, 2006

(86) PCT No.: PCT/JP2006/308535
§ 371 (c)(1),
(2), (4) Date: Nov. 6, 2007

(87) PCT Pub. No.: WO2006/123510

PCT Pub. Date: Nov. 23, 2006

(65) Prior Publication Data
US 2009/0019836 A1    Jan. 22, 2009

(30) Foreign Application Priority Data
May 16, 2005 (JP) .................. 2005-142389

(51) Int. Cl.
*F01N 3/00* (2006.01)
(52) U.S. Cl. ............ 60/295; 60/274; 60/285; 60/301
(58) Field of Classification Search ............ 60/274, 60/285, 295, 301
See application file for complete search history.

(56) References Cited

U.S. PATENT DOCUMENTS

| | | | |
|---|---|---|---|
| 6,595,307 B2 * | 7/2003 | Suzuki | 180/65.235 |
| 7,587,888 B2 * | 9/2009 | Shirakawa | 60/278 |
| 7,770,386 B2 * | 8/2010 | Lowe et al. | 60/295 |
| 2005/0022506 A1 | 2/2005 | Nishizawa et al. | |
| 2005/0102997 A1 | 5/2005 | Gabe et al. | |

FOREIGN PATENT DOCUMENTS

| | | |
|---|---|---|
| JP | 10-030430 | 2/1998 |
| JP | 2000-87793 | 3/2000 |
| JP | 2000-320386 | 11/2000 |
| JP | 2000-356127 | * 12/2000 |
| JP | 2001-200715 | 7/2001 |
| JP | 2002-155784 | 5/2002 |
| JP | 2004-92497 | 3/2004 |
| JP | 2004-285832 | 10/2004 |
| JP | 2005-48745 | 2/2005 |
| WO | WO 03/069137 | 8/2003 |

OTHER PUBLICATIONS

Japanese Written Report of Reconsideration by Examiner before Appeal dated Jun. 13, 2010 in Application No. 2007-008963. Patent Abstracts of Japan, Publication No. 2002-155784, published May 31, 2002.
Patent Abstracts of Japan, Publication No. 10-030430, published Feb. 2, 1998.
Patent Abstracts of Japan, Publication No. 2000-320386, published Nov. 21, 2000.

* cited by examiner

*Primary Examiner* — Thomas Denion
*Assistant Examiner* — Diem Tran
(74) *Attorney, Agent, or Firm* — Staas & Halsey LLP (57) ABSTRACT

An exhaust gas purification system has a NOx purification catalyst that purifies exhaust gas of NOx when an air-fuel ratio of exhaust of an internal combustion engine mounted on a vehicle is in a lean condition and recovers purification ability when the air-fuel ratio is in a rich condition. The system performs recovery control for setting the exhaust gas to a rich air-fuel condition in order to recover the NOx purification ability of the NOx purification catalyst, and at a time of retardation of the vehicle, both a fuel system rich control and an air intake rich control are used in the recovery control. The recovery control can be performed without worsening the drive comfort of the vehicle and with less fuel consumption.

5 Claims, 4 Drawing Sheets

EXHAUST GAS PURIFICATION METHOD AND EXHAUST GAS PURIFICATION SYSTEM

CROSS REFERENCE TO RELATED APPLICATIONS

This application claims the benefit under 35 U.S.C. Section 371, of PCT International Application Number PCT/JP2006/308535, filed Apr. 24, 2006 and Japanese Application No. 2005-142389 filed May 16, 2005 in Japan, the contents of which are incorporated herein by reference.

FIELD OF THE INVENTION

The present invention relates to exhaust gas purification methods and exhaust gas purification systems including NOx purification catalysts that reduce and purify NOx (nitrogen oxides) in the exhaust gas of an internal combustion engine.

DESCRIPTION OF THE RELATED ART

The present invention relates to exhaust gas purification methods and exhaust gas purification systems comprised including NOx purification catalysts that reduce and purify NOx (nitrogen oxides) in the exhaust gas of an internal combustion engine.

A variety of research and proposals have been forwarded regarding the use of NOx catalysts for the purpose of reducing and eliminating NOx in the exhaust gases of various combustion devices and internal combustion engines such as diesel engines and certain types of gasoline engines. The activities include the possibility of using NOx occlusion reduction-type catalysts or NOx direct reduction-type catalysts as a NOx reducing catalyst in diesel engines. By using these types of catalysts, exhaust gas can be effectively purified of NOx present therein.

This NOx occlusion reduction-type catalyst is comprised of a catalyst noble metal that promotes oxidation and reducing reactions, and a NOx occlusion material (NOx occlusion substance) with NOx occlusion properties in an oxide carrier layer of alumina (Al2O3) or zeolite. For the catalyst noble metal, metals such as platinum (Pt) or palladium (Pd) may be used. The NOx occlusion material may include several of the following: alkali metals such as potassium (K), sodium (Na), lithium (Li), and cesium (Ce); alkali earth metals such as barium (Ba) and calcium (Ca); and rare earth elements such as lanthanum (La) and yttrium (Y).

When an air-fuel ratio of the exhaust gas flowing into the catalyst, is in a lean state (i.e., an abundance of oxygen) and oxygen (O2) is present in the atmosphere, this NOx occlusion reduction-type catalyst causes nitric oxide (NO) in the exhaust gas to oxidize by the noble metals and become nitrogen dioxide (NO2). This nitrogen dioxide is subsequently accumulated to the NOx occlusion material as nitrate salt (such as Ba2NO4).

In addition, when the air-fuel ratio of the exhaust gas flowing into the catalyst becomes the theoretical air-fuel ratio or a rich state (i.e., a low-oxygen concentration) and oxygen becomes nonexistent in the atmosphere, the NOx occlusion material such as barium bonds with carbon monoxide (CO), and nitrogen dioxide is decomposed from the nitrate salts and released. This released nitrogen dioxide, as a result of the three way properties of the noble metals, is reduced to nitrogen ($N_2$) by unburned hydrocarbon (HC) and carbon monoxide (CO) in the exhaust gas. As a result, the components of the exhaust gas are released in the atmosphere as harmless substances such as carbon dioxide ($CO_2$), water ($H_2O$), and nitrogen ($N_2$).

In exhaust gas purification systems provided with this NOx occlusion reduction-type catalyst, when the majority of the NOx occlusion substance is converted to nitrate salt, the NOx occlusion ability becomes saturated. For this reason, when the NOx occlusion ability becomes almost saturated, the regeneration operations are performed in order to release occluded NOx and regenerate the catalyst. In these regeneration operations, the amount of fuel is increased beyond the theoretical air-fuel ratio to make the air-fuel ratio of the exhaust gas rich. The oxygen concentration of inflowing exhaust gas is thereby lowered, and a reduction composition exhaust gas is provided to the catalyst. By performing this rich control for NOx occlusion ability restoration, absorbed NOx is released and the released NOx is subsequently reduced by the noble metal catalyst.

Also, in order to effectively take advantage of the NOx occlusion reduction-type catalyst, the necessary sufficient amount of reducing agent for reducing NOx occluded in the lean condition must be provided in the rich condition. However, in diesel engines, if the rich condition is realized only by fuel system, fuel efficiency worsens. For that reason, for example in Japanese patent application Kokai publication No. H06-336916, an air intake is throttled by throttle valve while at the same time opening an EGR (exhaust gas recirculation) valve, thereby providing a large amount of EGR gas while reducing the amount of air intake in order to generate reducing exhaust gas. Additionally, in order to deepen rich deepness, fuel is added, and in-cylinder combustion is switched to rich spike combustion.

On the other hand, NOx direct reduction-type catalysts include a carrier such as β type zeolite carrying catalyst components such as the metals rhodium (Rh) and palladium (Pd). Furthermore, processing such as the following is performed. The oxidizing action of the metal is diminished, and cesium (Ce), which contributes to the maintenance of the NOx reduction ability, is combined. In the lower layer a three-way catalyst is provided to promote oxidation-reduction reactions, particularly the NOx reduction reactions in the rich condition. In order to improve the NOx purification ratio iron (Fe) is added to the carrier.

When in the atmosphere with a high oxygen concentration, such as when the air-fuel ratio of the exhaust gas of internal combustion engines such as diesel engines is in a lean condition, this NOx direct reduction-type catalyst directly reduces NOx to nitrogen ($N_2$). However, during this reduction, oxygen ($O_2$) is adsorbed to the catalytic active substance, i.e. the metal, thereby worsening reduction performance. For that reason, it is necessary to make the oxygen concentration in the exhaust gas near zero so that the air-fuel ratio of the exhaust gas becomes the theoretical air-fuel ratio or a rich condition, so as to regenerate and activate the catalytic active substance.

Also, similarly to NOx occlusion reduction-type catalysts, when in the case of normal engine operation, in other words, when the air-fuel ratio of the exhaust gas is in a lean condition, NOx is purified. Catalyst that is oxidized during this purification is subsequently reduced when in a rich condition, thereby recovering NOx purification ability.

Additionally, the NOx purification ability of NOx occlusion reduction-type catalysts and NOx direct reduction-type catalysts decrease as a result of sulfur present in the exhaust gas. Although the air-fuel ratio and catalyst temperature differ to a certain extent when performing regeneration from sulfur poisoning, a regeneration control is performed like the above-mentioned method wherein the exhaust gas is brought into a rich air-fuel ratio state. This regeneration control is referred to as desulfurization control.

In the regeneration control using a rich air-fuel ratio in order to recover NOx purification ability of the NOx occlusion reduction-type catalysts and the NOx direct reduction-type catalysts, it is necessary to lower the air-fuel ratio of the exhaust gas flowing into the catalyst to less than the theoretical air-fuel ratio. In normal diesel combustion, the exhaust gas contains an abundance of oxygen, i.e., the gas is in a lean air-fuel ratio condition. Consequently, in order to make a rich air-fuel ratio wherein almost no oxygen is present for the regeneration control, both of an air-intake system rich control and a fuel system rich control are performed.

By opening an EGR valve to allow the intake of EGR gas and/or throttling air intake, the air-intake system rich control lowers the amount of available fresh air. By performing post injection as in-cylinder injection and/or providing fuel directly into the exhaust pipe by in-exhaust-pipe injection, the fuel system rich control introduces or increases the amount of fuel present in the exhaust gas.

However, in the NOx purification catalyst regeneration control, the speed of the reactions in the NOx purification catalyst is lowered in the case where the temperature of the exhaust gas is in a low temperature range. This condition occurs when the engine is in a low engine speed or low load state, such as when idling or driving at a tow speed. For that reason, the time required for the regeneration becomes longer. Furthermore, an engine operating in a low temperature range in a rich state for a long period of time produces several adverse affects, including: unburned hydrocarbon (HC), carbon monoxide (CO), and NOx flowing out to the downstream side of the NOx purification catalyst; worsening of drive comfort (drivability); and worsening of fuel efficiency.

In contrast, the present inventors have obtained the following knowledge. When a vehicle is decelerating, since it is not necessary for the internal combustion engine to generate torque, air-intake throttling and/or exhaust throttling may be maximized by the air-intake system rich control. Even if the air intake amount is minimized, in such conditions this will not lead to a worsening of drive comfort. Furthermore, since the air intake amount can be significantly lessened, the amount of fuel provided by the fuel system rich control necessary to bring the exhaust gas to a rich air-fuel ratio condition is also significantly lessened. Consequently, the inventors have found that the worsening of fuel efficiency as a result of the regeneration control can be suppressed.

Patent Document 1: Japanese patent application Kokai publication No. H10-30430

Patent Document 2: Japanese patent application Kokai publication No. 2000-320386 (page 11 paragraph 20)

SUMMARY OF THE INVENTION

The present invention, being the application of the above-mentioned knowledge, has been devised in order to solve the above-mentioned problems. Namely, it is an object of the present invention to provide an exhaust gas purification method and an exhaust gas purification system wherein the NOx purification ability of a NOx purification catalyst is recovered by a regeneration control by bringing the exhaust gas of an internal combustion engine mounted on a vehicle into a rich air-fuel ratio state without worsening drive comfort, and furthermore wherein the regeneration control is performed while worsening of fuel efficiency is suppressed.

In the exhaust gas purification method designed to achieve the above-mentioned object, a regeneration control is performed wherein both a fuel system rich control and an air-intake system rich control are used in parallel when the vehicle is decelerating. This regeneration control is performed by an exhaust gas purification system provided with a NOx purification catalyst and a catalyst regeneration control device. This system is provided with the NOx purification catalyst and catalyst regeneration control device. The NOx purification catalyst purifies NOx in the case where the exhaust gas of an internal combustion engine mounted on a vehicle is in a lean condition, and in addition, recovers NOx purification ability of the NOx purification catalyst in the rich condition. The catalyst regeneration control means performs the regeneration control by bringing the exhaust gas into a rich air-fuel ratio condition in order to recover NOx purification ability of the NOx purification catalyst.

The NOx purification catalyst referred to herein may include a NOx occlusion reduction-type catalyst or a NOx direct reduction-type catalyst. The NOx purification ability recovery may include NOx occlusion ability recovery and the recovery from sulfur poisoning in the case of a NOx occlusion reduction-type catalyst, or it may include NOx reducing ability recovery and the recovery from sulfur poisoning in the case of a NOx direct reduction-type catalyst.

In addition, the exhaust gas air-fuel ratio referred to herein does not necessarily mean only the in-cylinder air-fuel ratio, but may also refer to the ratio obtaining between the amount of supplied air present in the exhaust gas inflowing into the NOx purification catalyst and the amount of supplied fuel (including the combusted in-cylinder portion of the fuel) present in this exhaust gas. Furthermore, the relationship between the air-fuel ratio (=amount of air/amount of fuel) and the excess air ratio is such that the excess air ratio=(air-fuel ratio/theoretical air-fuel ratio).

Also, the fuel system rich control brings exhaust gas flowing into the NOx purification catalyst into a rich air-fuel ratio condition by a combination of injection methods, including in-cylinder fuel injection such as multi-stage injection or post injection, and the oxidation catalyst and direct injection of fuel into the exhaust gas pipe. The air-intake system rich control brings the exhaust gas into a rich air-fuel ratio condition with a low amount of fuel by lowering the amount of fresh air intake. The fresh air intake may be lowered by air-intake throttling, exhaust throttling, operating an EGR valve, or by a combination of these methods.

As a result of this exhaust gas purification method, when the vehicle is decelerating, the fuel system rich control can be performed in the regeneration control by in-cylinder fuel injection methods such as multi-stage injection and post injection without worsening drive comfort, since it is not necessary for the internal combustion engine to generate torque during the deceleration. Consequently, the worsening of drive comfort during the regeneration control period that occurs in the conventional art when performing the regeneration control during the vehicle deceleration is prevented.

In addition, in the above-mentioned exhaust gas purification method, when the air-intake system rich control of the regeneration control is performed when the vehicle is decelerating, the amount of fresh air intake is lowered through using in parallel exhaust throttling and air-intake throttling.

Since torque generation is not required during the vehicle deceleration, the fuel for generating torque is no longer required, and the air for the purpose of combusting this fuel (fresh air intake) is also no longer required. For that reason, in the air-intake system rich control, air-intake throttling and exhaust throttling can be maximized. By thus minimizing the amount of the fresh air intake, the amount of fuel required to bring the exhaust gas into a rich air-fuel ratio condition by the fuel system rich control is significantly lowered. As a result, worsening of fuel efficiency due to the regeneration control is suppressed.

In addition, the above-mentioned exhaust gas purification method includes an exhaust gas temperature rise control. When commencing the regeneration control during the vehicle deceleration, if a NOx catalyst temperature index temperature corresponding to the NOx catalyst temperature is less than the regeneration-possible temperature at which it is possible to perform the regeneration control to recover the NOx purification ability of the NOx purification catalyst, the temperature of the exhaust gas flowing into the NOx purification catalyst is raised before performing the regeneration control.

NOx catalyst temperature index temperature herein refers to the measured temperature of the NOx purification catalyst or a temperature closely related to the catalyst temperature. This related temperature has an approximately 1-to-1 correspondence with the catalyst temperature, and may include the measured temperature of the exhaust gas flowing into the NOx purification catalyst, or an estimated exhaust gas temperature estimated or calculated from previously input map data derived from engine driving conditions. Fundamentally, any component capable of estimating or specifying the temperature of the NOx purification catalyst may be used.

In addition, this regeneration-possible temperature refers to the minimum temperature at which, in the case of a NOx occlusion reduction-type catalyst, NOx is released from the NOx occlusion material, and furthermore, at which it is possible for the noble metal catalyst to reduce the released NOx or recover the catalyst from sulfur poisoning. In addition, this regeneration-possible temperature refers to the minimum temperature at which, in the case of a NOx direct reduction-type catalyst, the catalytically active substance, that is the metal, can be reduced and activated or recovered from sulfur poisoning. This regeneration-possible temperature is determined in accordance with the NOx catalyst temperature index temperature, and the regeneration can be started when the NOx catalyst temperature index temperature reaches the regeneration-possible temperature.

As a result of this exhaust gas purification method, the regeneration control is commenced after raising the NOx catalyst temperature index temperature to beyond that of the regeneration-possible temperature by raising the temperature of the exhaust gas. For this reason, reduction agents such as HC and CO present in the exhaust gas are reliably consumed during the regeneration control. As a result, unused reduction agents such as HC and CO no longer flow to the downstream side of the NOx purification catalyst.

In addition, in the above-mentioned exhaust gas purification method, an oxidation regeneration control is performed to re-activate an oxidation catalyst. This oxidation regeneration control is performed by an exhaust gas purification system provided with an oxidation catalyst on the upstream side of the NOx purification catalyst. When commencing the regeneration control during the vehicle deceleration, if an oxidation catalyst temperature index temperature corresponding to the oxidation catalyst temperature is less than the catalyst activation temperature at which the oxidation catalyst is activated, a temperature rise control is performed to raise the temperature of the exhaust gas flowing into the oxidation catalyst before performing the regeneration control. Once the oxidation catalyst temperature index temperature becomes higher than the catalyst activation temperature, the regeneration control is performed.

The oxidation catalyst temperature index temperature herein refers to the measured temperature of the oxidation catalyst or a temperature closely related to this catalyst temperature. This related temperature has an approximately 1-to-1 correspondence with the catalyst temperature, and may include the measured temperature of the exhaust gas flowing into the oxidation catalyst, or an estimated exhaust gas temperature estimated or calculated from previously input map data derived from engine driving conditions. Fundamentally, any component capable of estimating or specifying the temperature of the oxidation catalyst may be used.

In addition, this catalyst activation temperature refers to the minimum temperature at which it is possible to activate the oxidation catalyst and initiate oxidation reactions. This catalyst activation temperature is determined in accordance with the oxidation catalyst temperature index temperature. The catalyst activation temperature is the temperature at which, if exceeded by the oxidation catalyst temperature index temperature, the oxidation catalyst is activated and facilitation of oxidation reactions becomes possible.

As a result of the exhaust gas purification method that includes the oxidation catalyst, the regeneration processing of the NOx purification catalyst can be performed at an even lower exhaust gas temperature. Consequently, the regeneration is possible over a wider engine operating range. In addition, the supplied substances such as HC and CO in the exhaust gas are oxidized through this oxidation catalyst, thereby creating a rich air-fuel ratio condition. Consequently, in-exhaust-pipe direct injection methods can also be adopted. As a result, exhaust gas can be brought into a rich air-fuel ratio condition regardless of torque variations.

Also, an exhaust gas purification system designed to achieve the above-mentioned object of the present invention has the following configuration. The system is provided with a NOx purification catalyst for purifying NOx when an air-fuel ratio of the exhaust gas in an internal combustion engine mounted on a vehicle is in a lean condition, and in addition, for recovering NOx purification ability in the rich condition. The catalyst regeneration control device performs the regeneration control by bringing the exhaust gas into a rich air-fuel ratio condition in order to recover NOx purification ability of the NOx purification catalyst. The catalyst regeneration control device performs the regeneration control by using in parallel a fuel system rich control and an air-intake system rich control when the vehicle is decelerating. In addition, in the air-intake system rich control of the regeneration control performed when the vehicle is decelerating, the amount of fresh air intake is lowered through using in parallel exhaust throttling and air-intake throttling.

In addition, in the above-mentioned exhaust gas purification system, the catalyst regeneration control device has the following configuration. When commencing the regeneration control during the vehicle deceleration, if a NOx catalyst temperature index temperature corresponding to the NOx catalyst temperature is less than the regeneration possible temperature at which it is possible to perform the regeneration control to recover NOx purification ability of the NOx purification catalyst, the temperature of the exhaust gas inflowing into the NOx purification catalyst is increased before performing the regeneration control.

In addition, in the above-mentioned exhaust gas purification system, an oxidation catalyst is provided on the upstream side of the NOx purification catalyst, and the catalyst regeneration control device has the following additional configuration. When commencing the regeneration control during the vehicle deceleration, if an oxidation catalyst temperature index temperature corresponding to the oxidation catalyst temperature is less than the catalyst activation temperature at which the oxidation catalyst is activated, a temperature rise control is performed to raise the temperature of the exhaust gas flowing into the oxidation catalyst before performing the regeneration control. Once the oxidation catalyst temperature index temperature becomes higher than the catalyst activation temperature, the regeneration control is performed.

Also, in this exhaust gas purification system, the NOx purification catalyst may be a NOx occlusion reduction-type catalyst that occludes NOx when the exhaust gas air-fuel ratio is in a lean condition, and additionally releases and reduces the occluded NOx when the air-fuel ratio is in a rich condition. Alternatively, the NOx purification catalyst may be a NOx direct reduction-type catalyst that reduces and purifies NOx when the exhaust gas air-fuel ratio is in a lean condition, and additionally recovers NOx purification ability when the air-fuel ratio is in a rich condition. Either of the above-mentioned catalysts may be applied as the NOx purification catalyst to achieve significant results.

The exhaust gas purification method and the exhaust gas purification system in accordance with the present invention exhibit the following advantages. When the vehicle is decelerating, since it is not necessary for the internal combustion engine to generate torque, the amount of fresh air intake can be reduced to the lowest extreme. In addition, since the amount of exhaust gas can be significantly lowered through using in parallel air-intake throttling and exhaust throttling, the amount of fuel used for in-cylinder fuel injection or in-exhaust-pipe direct injection in order to bring the exhaust gas into a rich air-fuel ratio condition can be lowered. Consequently, the regeneration processing can be efficiently performed while suppressing the worsening of fuel efficiency.

In addition, by lowering the amount of exhaust gas and retaining the high temperature exhaust gas in the cylinders, the temperature of the exhaust gas can be effectively raised. Additionally, even in the case where the exhaust gas temperature is low, the exhaust gas temperature can be raised with a small amount of fuel, since the amount of exhaust gas has been lowered. Consequently, during the regeneration control, the amount of fuel used to raise the temperature of the exhaust gas in order to raise the catalyst temperature can also be lowered.

DESCRIPTION OF EMBODIMENTS

Hereinafter, embodiments of the exhaust gas purification method and the exhaust gas purification system in accordance with the present invention will be described with reference to the accompanying drawings.

The following description describes as the NOx purification catalyst a NOx occlusion reduction-type catalyst by way of example, but it is also possible to apply other catalysts such as a NOx direct reduction-type catalyst to the present invention. In addition, although the recovery of NOx purification ability by the rich air-fuel ratio condition is primarily described in terms of the recovery of NOx occlusion ability of NOx occlusion reduction-type catalysts, this recovery also includes the recovery of NOx occlusion reduction-type catalysts from sulfur poisoning, or alternatively, the recovery of NOx reduction ability of NOx direct reduction-type catalysts or the recovery from sulfur poisoning, and it is possible to apply these other types of the recovery to the present invention.

In addition, the rich condition of the exhaust gas referred to herein does not necessarily mean only in-cylinder rich combustion, but also the condition when the ratio between the supplied amount of air present in the exhaust gas inflowing into the NOx occlusion reduction-type catalyst and the amount of fuel (including the combusted in-cylinder portion of the fuel) is close to the theoretical air-fuel ratio (the stoichiometric state), or alternatively when the amount of fuel exceeds that of the theoretical air-fuel ratio, this condition being referred to as a rich condition.

Figure 1:
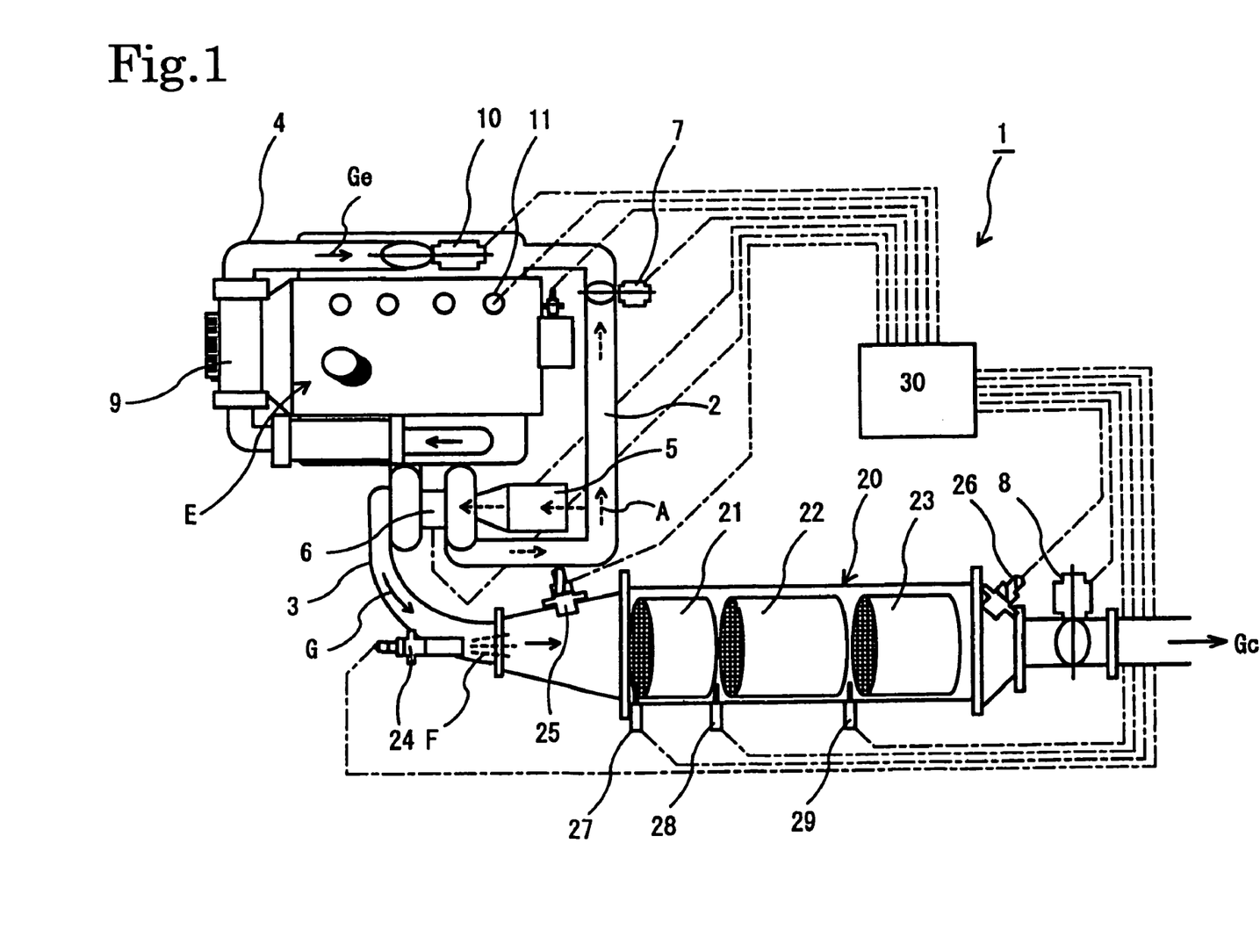
FIG. 1 is a diagram showing the configuration of an exhaust gas purification system in accordance with an embodiment of the present invention.

FIG. 1 shows the configuration of an exhaust gas purification system 1 in accordance with an embodiment of the present invention. In this exhaust gas purification system 1, an exhaust gas purifier 20 is disposed in the exhaust passage 3 of an engine (internal combustion engine) E, the purifier 20 having an oxidation catalyst 21, a NOx occlusion reduction-type catalyst 22, and a diesel particulate filter unit 23 (hereinafter, DPF).

The oxidation catalyst 21 is formed by depositing a catalyst coat layer such as active aluminum oxide (Al2O3) on the surface of a carrier of honeycomb cordierite or heat resistance steel. Upon this catalyst coat layer are carried catalytic active components constituted by noble metals such as platinum (Pt), palladium (Pd), and rhodium (Rh). This oxidation catalyst 21 oxidizes substances such as HC and CO present in inflowing exhaust gas. As a result, the exhaust gas G is made to be in a low oxygen condition, and its exhaust temperature is raised due to combustion heat.

The NOx occlusion reduction-type catalyst 22 is formed as a monolith catalyst. A catalyst coat layer is deposited on a carrier of aluminum oxide or titanium oxide. Upon this catalyst coat layer are carried catalyst metals such as platinum (Pt), and NOx occlusion material (NOx occlusion substance) such as barium (Ba).

At the NOx occlusion reduction-type catalyst 22, when the exhaust gas is in a condition of high oxygen concentration (i.e., a lean air-fuel ratio condition), NOx in the exhaust gas is occluded by the NOx occlusion material, and as a result the exhaust gas is purified of NOx therein. In addition, when the exhaust gas is in a condition of low or zero oxygen concentration (i.e., a rich air-fuel ratio condition), occluded NOx is released, and this released NOx is reduced by the catalytic action of the catalyst metal. As a result, the outflow of NOx in the atmosphere is prevented.

The DPF 23 is formed for example as a monolith honeycomb wall flow type filter, wherein the entrances and exits of the porous ceramic honeycomb channels are blocked alternately. This DPF 23 collects PM (particulate matter) present in the exhaust gas. This DPF 23 may also carry an oxidation catalyst or PM oxidation catalyst in order to promote elimination by combustion of PM.

In addition, a mass air flow sensor (MAF sensor) 5 for measuring the amount of air intake, and an air-intake throttle valve 7 for adjusting the amount of air intake, are installed in the air-intake passage 2. Downstream to the exhaust gas purifier 20 in the exhaust passage 3, an exhaust throttle valve (exhaust throttle) 8 for an exhaust brake is installed. In addition, in the EGR passage 4, an EGR cooler 9 and an EGR valve 10 for adjusting the amount of EGR are installed.

In addition, upstream to the oxidation catalyst 21 a first exhaust component concentration sensor 25 is disposed, and downstream to the DPF 23 a second exhaust component concentration sensor 26 is disposed. These exhaust component concentration sensors 25 and 26 are sensors integrating respectively the following three sensors: a λ sensor (air excess ratio sensor), a NOx concentration sensor, and an oxygen concentration sensor. It should be appreciated that oxygen concentration sensors or air excess ratio sensors may be implemented instead of the first and second exhaust component concentration sensors 25 and 26. However, in this case, the NOx concentration sensor must be installed separately, or alternatively the control will not use measured values of NOx concentration. In addition, in order to detect the exhaust gas temperature, a first temperature sensor 27 is disposed upstream to the oxidation catalyst 21, a second temperature sensor 28 is disposed between the oxidation catalyst 21 and the NOx occlusion reduction-type catalyst 22, and a third temperature sensor 29 is disposed between the NOx occlusion reduction-type catalyst 22 and the DPF 23. By using these first, second, and third temperature sensors, the catalyst temperatures of the oxidation catalyst 21 and the NOx occlusion reduction-type catalyst 22 are estimated.

In addition, in the case where in-exhaust-pipe direct injection is performed as part of the fuel system rich control, an MC supply valve (fuel injection valve) 24 for supplying hydrocarbons (HC) F which becomes the reducing agent for NOx is installed upstream to the exhaust gas purifier 20 in the exhaust passage 3. This HC supply valve 24 directly injects into the exhaust passage 3 the fuel F, such as diesel fuel for the engine E, from a fuel tank (not shown in the drawings). As a result, the HC supply valve 24 brings the air-fuel ratio of an exhaust gas G into a lean condition, a rich condition, or the stoichiometric condition (theoretical air-fuel ratio condition). This HC supply valve 24 acts as an in-exhaust-pipe injection rich control means. In the case where the fuel system rich control is performed by post injection of an in-cylinder fuel injection means, this HC supply valve 24 becomes unnecessary.

In addition, a control unit (ECU: engine control unit) 30 is installed for performing both the general control of the operation of the engine E as well as the regeneration control for the restoration of NOx purification ability of the NOx occlusion reduction-type catalyst 22. The detected values from the first and second exhaust component concentration sensors 25 and 26, as well as the first-third temperature sensors 27, 28, and 29 are input into this control unit 30. In addition, the control unit 30 outputs signals to control the air-intake throttle valve 7 of the engine E, the exhaust throttle valve 8, the EGR valve 10, the fuel injection valve 11 of the common-rail electronic control fuel injection unit, and the HC supply valve 24.

In this exhaust gas purification system 1, an air A passes through the mass air flow sensor (MAF sensor) 5 and the compressor of a turbocharger 6 in the air-intake passage 2. Subsequently, the amount of the air A is adjusted by the air-intake throttle valve 7 and then enters the cylinders from the intake manifold. Then, an exhaust gas G generated in the cylinders flows out into the exhaust passage 3 from the exhaust manifold and drives the turbine of the turbocharger 6. Subsequently, the exhaust gas G passes through the exhaust gas purifier 20, becoming purified exhaust gas Gc. This purified exhaust gas Gc is passed through a muffler (not shown in the drawings) by the exhaust throttle valve 8 and exhausted in the atmosphere. In addition, a portion of the exhaust gas G passes through the EGR cooler 9 in the EGR passage 4, the amount thereof is adjusted by the EGR valve 10, and then re-circulated into the intake manifold as EGR gas Ge.

Furthermore, a control unit for the exhaust gas purification system 1 is built into the control unit 30 of the engine E and controls the exhaust gas purification system 1 in parallel to the control of the operation of the engine E. The control unit of the exhaust gas purification system 1 is provided with a catalyst regeneration control device and performs the control of the exhaust gas purification system 1, including a NOx regeneration control of the NOx occlusion reduction-type catalyst 12.

In the regeneration control performed by the catalyst regeneration control device, the air-fuel ratio of exhaust gas is controlled a rich condition (the stoichiometric air-fuel ratio condition, i.e., the theoretical air-fuel ratio condition, is also included) by an air-intake system rich control and a fuel system rich control. In the air-intake system rich control, the exhaust gas air-fuel ratio is lowered by opening the EGR valve 10 to increase the amount of EGR, as well as by closing the intake valve 7 and the exhaust valve 8. In addition, in the fuel system rich control, the air-fuel ratio of the exhaust gas G is lowered through executing in-cylinder fuel injections such as post injections. Alternatively, in the case where the HC supply valve 24 is used, the fuel F such as hydrocarbon (HC) fuel is supplied directly into the exhaust passage 3 by the HC supply valve 24, thereby oxidizing the oxidation catalyst 21. As a result of this oxidation, the air-fuel ratio of the exhaust gas G is lowered.

By these rich controls, the NOx catalyst regeneration is performed after bringing the exhaust gas condition into a predetermined air-fuel ratio condition, and in addition bringing the exhaust gas temperature into a predetermined temperature range. As a result, NOx occlusion ability, i.e., NOx purification ability, is recovered. The predetermined air-fuel ratio in the case of recovering NOx occlusion ability of the NOx occlusion reduction-type catalyst, while depending on the type of purification catalyst, is approximately 0.8-1.0 by conversion the air excess ratio (λ). In addition, the predetermined temperature range in the case of recovering NOx occlusion ability of the NOx occlusion reduction-type catalyst, while depending on the type of purification catalyst, is approximately 300° C.-600° C.

Figure 2:
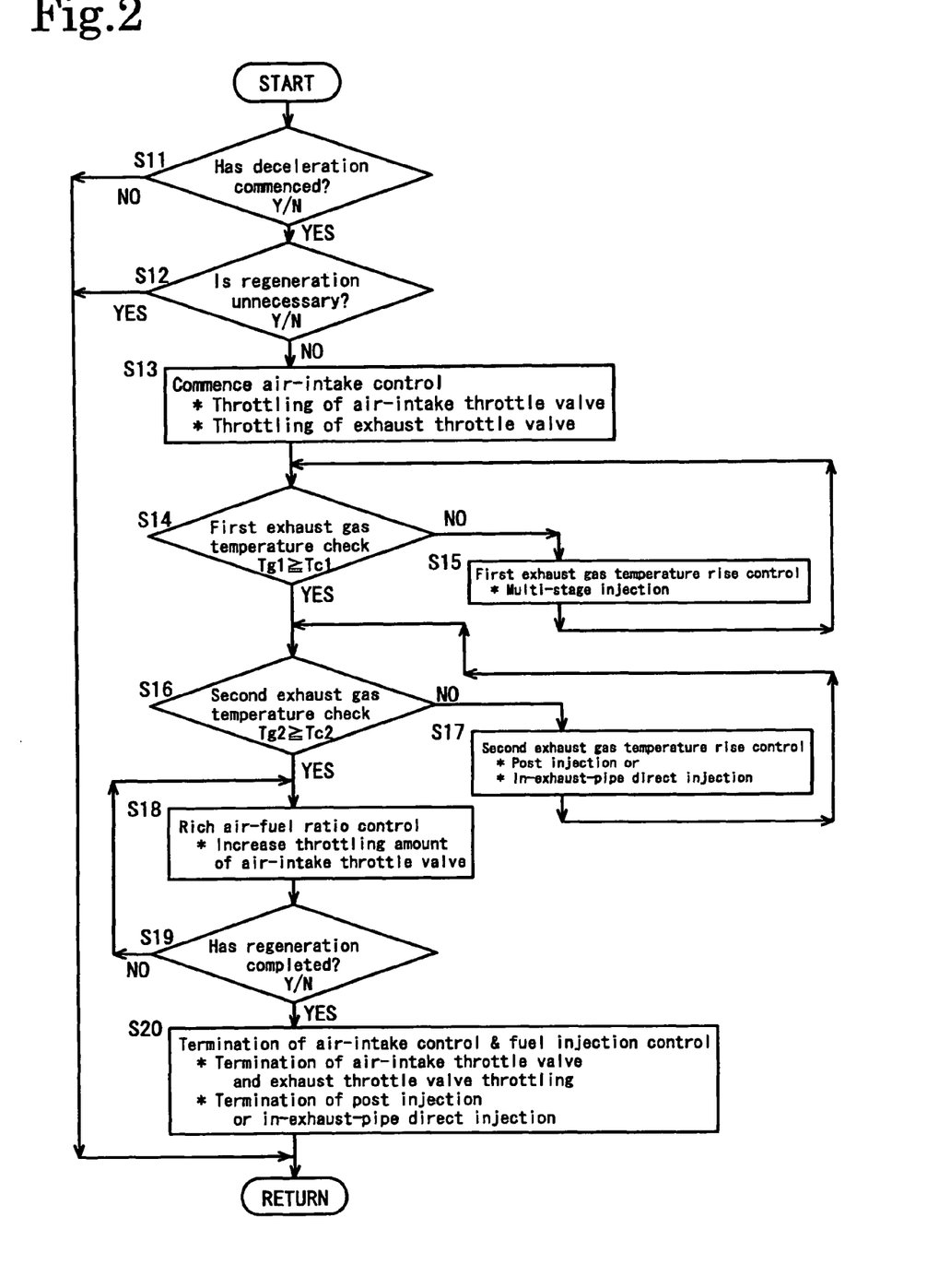
FIG. 2 is a flowchart showing an example regeneration control process during vehicle deceleration using a NOx occlusion reduction-type catalyst in accordance with an embodiment of the present invention.

In addition, in the exhaust gas purification system 1, the control unit of the exhaust gas purification system 1, which is built into the control unit 30 of the engine E, performs the regeneration control of the NOx occlusion reduction-type catalyst 22 in accordance with the vehicle deceleration regeneration control flowchart shown in FIG. 2. Furthermore, the regeneration control flowchart shown in FIG. 2 is shown as being repeatedly called, cycled back, and executed, respectively, in parallel with other control flowcharts of the engine E during the operation of the engine E.

Figure 3:
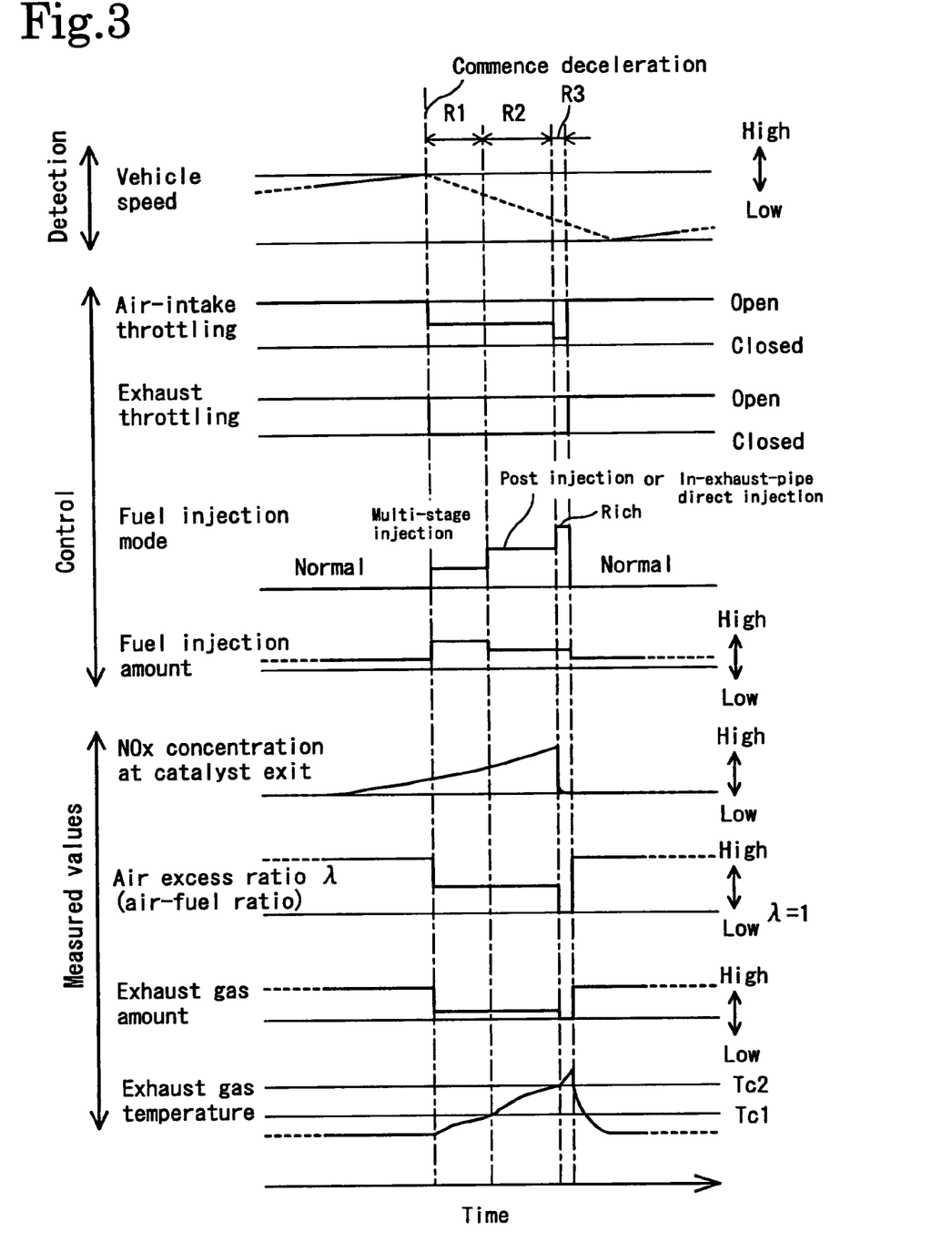
FIG. 3 is a conceptual time series showing an example of the control variables and other associated variables in the regeneration control during vehicle deceleration using a NOx occlusion reduction-type catalyst.

In addition, in an embodiment of the present invention, a regeneration control is performed as illustrated by example in the vehicle deceleration regeneration control flowchart in FIG. 2 and the control time series in FIG. 3. In the vehicle deceleration regeneration control flowchart in FIG. 2, when this control flowchart is called and started, it is first determined in step S11 whether or not the vehicle upon which is mounted the exhaust gas purification system 1 is in a state of commencing deceleration. If the vehicle is determined to not be in a state of commencing deceleration, the process skips directly to RETURN.

This deceleration determination, in other words, the determination of whether or not the vehicle upon which is mounted the exhaust gas purification system 1 is in a state of commencing deceleration, is determined based on accelerator opening, decreases in the engine speed, and decreases in the amount of fuel flow per unit time. For example, when an accelerator sensor senses opening to be zero, the vehicle is determined to be in a decelerating state.

In the case where the vehicle is determined to be in a state of commencing deceleration in step S11, it is determined whether or not the regeneration of the NOx occlusion reduction-type catalyst is unnecessary in the next step S12. While it is ordinarily preferable to perform the regeneration of NOx purification ability frequently during deceleration, in cases where it is not preferable to perform the regeneration control, such as immediately after performing a previous regeneration control or when the exhaust gas temperature is too low (for example, not more than 100° C.), the regeneration is determined to be unnecessary and the process skips directly to RETURN.

The determination of whether regeneration is unnecessary is determined in the following way. For example, if the amount of time elapsed since the last regeneration control has not exceeded a predetermined determination time, the regeneration is determined to be unnecessary. Alternatively, a NOx purification rate is calculated from the NOx concentration upstream and downstream to the NOx occlusion reduction-type catalyst 22. If this NOx purification rate is not lower than a predetermined determination value, the regeneration is determined to be unnecessary.

In addition, in the case where regeneration is not unnecessary in step S12, in other words, when it is determined to be acceptable to perform the regeneration processing, the process proceeds to step S13 and the regeneration control is commenced. In this step S13, the air-intake system control is commenced, wherein the both the air-intake throttle valve 7 is throttled and the exhaust throttle valve 8 is throttled. Furthermore, at the same time, the EGR valve 10 is opened and the amount of EGR is increased. As a result, the amount of fresh air intake is lowered.

In the following step S14 a first exhaust gas temperature check is performed. In this step, it is determined whether or not an exhaust gas temperature (oxidation catalyst temperature index temperature) Tg1, detected by the first temperature sensor 27, is greater than the catalyst activation temperature (for example, approximately 150° C.) Tc1 of the oxidation catalyst 21. If greater, the process proceeds to step S16, and if lesser, the process proceeds to step S15 wherein a first exhaust gas temperature rise control is performed.

Figure 4:
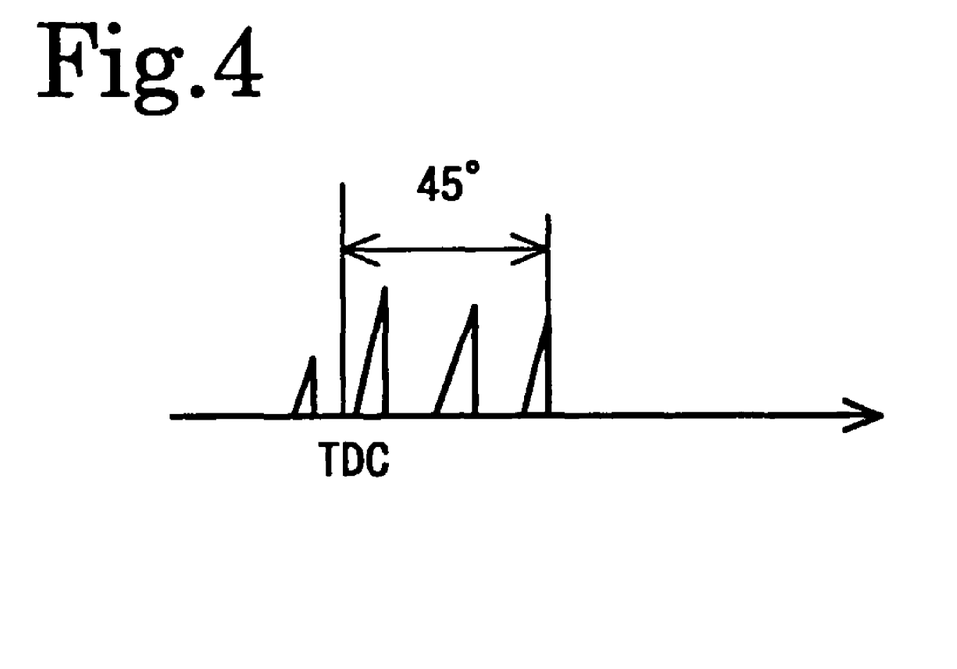
FIG. 4 is a diagram showing an example of multi-stage injection in in-cylinder fuel injection.

In the first exhaust gas temperature rise control in step S15, a first air-intake throttling, exhaust throttling, a multi-stage injection fuel injection mode, and a multi-stage injection control using a first fuel injection amount are performed, as shown in the first stage R1 of FIG.3. In this multi-stage injection control as shown in FIG.4, the injection is performed in 3-5 stages until the expansion stroke, the combustion flame is maintained, and the engine exhaust temperature is raised. The final injection timing is approximately 45° ATDC (after top dead center). After performing the first exhaust gas temperature rise control in step S15 for a predetermined time Δt1 (this time is related to the exhaust gas temperature check interval), the process returns to step S14. Step 515 is repeated until the exhaust gas temperature Tg1 is activated and greater than the catalyst activation temperature Tc1 wherein substances such as HC and CO in the exhaust gas can be oxidized. Once the exhaust gas temperature Tg1 is greater than the catalyst activation temperature Tc1, the process proceeds to step S16. In this first stage R1, the air-fuel ratio of the exhaust gas flowing into the NOx occlusion reduction-type catalyst 22 is controlled by conversion, the air excess ratio being approximately $\lambda=1.02-1.1$.

In the present description, the exhaust gas temperature Tg1 is used as the oxidation catalyst temperature index temperature. However, it should be appreciated that the catalyst temperature of the oxidation catalyst 21 may also be directly measured and used. In addition, an estimated exhaust gas temperature based on the engine speed and the engine load exhibited by the operating state of the engine E may also be used.

In addition, in step S16 a second exhaust gas temperature check is determined. In this step, it is determined whether or not an exhaust gas temperature (the NOx catalyst temperature index temperature) Tg2 measured by the second temperature sensor 28 is greater than a regeneration possible temperature (for example, 250° C.-300° C.) Tc2. If greater, the process proceeds to step S18, and if lesser, the process proceeds to step S17. In step S17, a second exhaust gas temperature rise control is performed.

Figure 5:
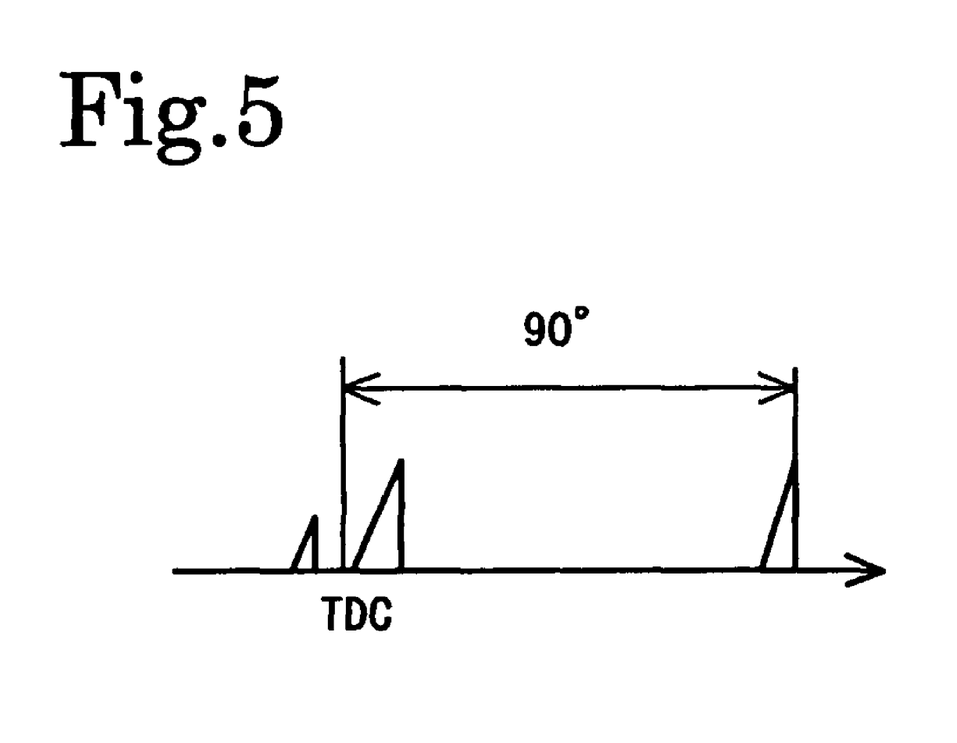
FIG. 5 is a diagram showing an example of post injection in in-cylinder fuel injection.

In the second exhaust gas temperature rise control in step S17, the fuel F is supplied within the exhaust gas by post injection at an injection timing of approximately 90° ATDC, or alternatively, by in-exhaust-pipe direct injection, as shown in FIG.5. HC (hydrocarbon) and CO (carbon monoxide) in the fuel F are oxidized through the oxidation catalyst 21, and the exhaust gas temperature is raised as a result of this oxidation heat. In this second exhaust gas temperature rise control, a first air-intake throttling, exhaust throttling, post injection fuel injection mode, and a post injection control (alternatively, an in-exhaust-pipe direct injection control) using a second fuel injection amount are performed, as shown in the second stage R2 in FIG.3. After performing the second exhaust gas temperature rise control in step S17 for a predetermined time Δt2 (this time is related to the exhaust gas temperature check interval), the process returns to step S16. Step S17 is repeated until the exhaust gas temperature Tg2 is greater than the regeneration possible temperature Tc2 (the temperature at which NOx occlusion ability is recovered to the NOx occlusion reduction-type catalyst 22, and furthermore at which released NOx can be reduced and purified). If the exhaust gas temperature Tg2 is greater than the regeneration possible temperature Tc2, the process proceeds to step S18. In this second stage R2, the air-fuel ratio of the exhaust gas flowing into the NOx occlusion reduction-type catalyst 22 is controlled by conversion, the air excess ratio being approximately $\lambda=1.02-1.01$.

Furthermore, in the regeneration control for the purpose of recovering the catalyst from sulfur poisoning, step S17 is repeated until the exhaust gas temperature Tg2 is greater than the regeneration possible temperature Tc2, the temperature at which the NOx occlusion reduction-type catalyst 22 can be recovered from sulfur poisoning.

In the present description, the exhaust gas temperature Tg2 is used as the NOx catalyst temperature index temperature. However, it should be appreciated that the catalyst temperature of the NOx occlusion reduction-type catalyst 22 may also be directly measured and used. In addition, an estimated exhaust gas temperature based on the engine speed and the engine load exhibited by the operating state of the engine E may also be used.

Furthermore, when the exhaust gas temperature Tg2 is greater than the regeneration possible temperature Tc2, the air-intake throttle valve 7 is further throttled, increasing the throttling amount, and a rich air-fuel ratio control is performed in step S18. In this rich air-fuel ratio control, a second air-intake throttling, exhaust throttling, rich fuel injection mode, and a control using the second fuel injection amount are performed, as shown in the third stage R3 in FIG.3. As a result, the air-fuel ratio of the exhaust gas flowing into the NOx occlusion reduction-type catalyst 22 is brought into a rich air-fuel ratio condition. After performing the rich air-fuel ratio control in step S18 for a predetermined time Δt3 (this time is related to the regeneration completion check interval in step S19), the process proceeds to step S19. In this third stage R3, the air-fuel ratio of the exhaust gas flowing into the NOx occlusion reduction-type catalyst 22 is controlled by conversion, the air excess ratio being approximately Δ0.9-1.01. In addition, in step S19 it is determined whether or not the regeneration control has completed. If the regeneration control has completed, the regeneration control is terminated in step S20 and the process proceeds to RETURN. If the regeneration control has not completed, the process returns to step S18, and the rich air-fuel ratio control is repeated.

Completion of the regeneration control is determined based on whether or not a predetermined amount of regeneration time has elapsed, this time being decided based on the NOx concentration value detected by the second exhaust component concentration sensor 26 at the catalyst exit side. Alternatively, the regeneration control completion may be determined based on whether or not the NOx purification ratio has exceeded a predetermined purification ratio for the regeneration control completion. Furthermore, when it is determined that the regeneration control has been completed, throttling of the air-intake throttle valve 7 and the exhaust throttle valve 8 is terminated and reverted to normal operational throttling amounts. Also, the EGR valve 10 is also reverted to a valve open state for normal engine operation and the air-intake system rich control is terminated. Also, post injection (or alternatively in-exhaust-pipe direct injection) is terminated and the fuel system rich control is terminated.

The respective periods for each of the regeneration control stages R1, R2, and R3 will differ according to the type of the oxidation catalyst 21 and the NOx occlusion reduction-type catalyst 22, and also the state of the engine E during the regeneration control. In particular, the period of the first stage R1 changes greatly according to the exhaust gas temperature when the deceleration of the vehicle speed is commenced. As an example, the period of second stage R2 is approximately 10 s-60 s, and the period of the third stage R3 is approximately 2 s-60 s.

In the above-mentioned exhaust gas purification method and exhaust gas purification system 1, the regeneration control is performed wherein a fuel system rich control and an air-intake system rich control are used in parallel during vehicle deceleration. However, it is not necessary for an internal combustion engine in deceleration to generate torque. For that reason, even when performing the regeneration control wherein a fuel system rich control is performed by the in-cylinder fuel injection using multi-stage injection or post injection, worsening of drive comfort is prevented.

In addition, since torque generation is unnecessary during the vehicle deceleration, the fuel for the purpose of generating torque is no longer required. Consequently, the fresh air intake for the purpose of combusting this fuel also becomes unnecessary. For that reason, in the air-intake system rich control, air-intake throttling and exhaust throttling can be maximized to reduce the amount of air intake to the minimum, thereby significantly lowering the amount of fresh air intake. As a result, the amount of fuel required for bringing the exhaust gas into a rich air-fuel ratio condition by the fuel system rich control is significantly lowered, and the worsening of fuel efficiency due to the regeneration control is suppressed.

Moreover, since the rich air-fuel ratio control for the regeneration is initiated after raising the temperature of the NOx occlusion reduction-type catalyst 22 beyond that of the regeneration possible temperature Tc2 by the first and second exhaust gas temperature rise controls, reduction agents such as HC and CO in the exhaust gas during the regeneration control are reliably consumed. Consequently, unused reducing agents such as HC and CO are prevented from flowing downstream to the NOx purification catalyst.

In addition, since the air-intake throttling and the exhaust throttling (exhaust braking) are used simultaneously during the deceleration to significantly lower the amount of exhaust gas, lowering of the exhaust gas temperature are prevented, and it becomes possible to maintain the catalyst bed temperature. For that reason, the fuel injection amount for in-cylinder fuel injection of post injection, or alternatively the fuel amount for exhaust pipe direct injection, is lowered. Furthermore, worsening of fuel efficiency can be improved.

The exhaust gas purification method and exhaust gas purification system in accordance with the present invention and having the above-mentioned beneficial advantages is suitable for highly effective use as an exhaust gas purification method and exhaust gas purification system for an internal combustion engine mounted on an automobile.

What is claimed is:

1. An exhaust gas purification method for performing a regeneration control for a NOx purification catalyst of an exhaust gas purification system provided in an internal combustion engine mounted on a vehicle, comprising:
   providing the regeneration control to include a fuel system rich control, and an air-intake system rich control;
   determining whether the vehicle is decelerating,
   when it is determined that the vehicle is not decelerating, the regeneration control is not performed,
   when it is determined that the vehicle is decelerating, determining whether the regeneration control is necessary, and
   when it is determined that the vehicle is decelerating and the regeneration control is necessary, the regeneration control is performed, including air intake throttling and exhaust throttling; and
   detecting a NOx catalyst temperature index temperature,
   wherein, when it is determined that the vehicle is decelerating and if the detected NOx catalyst temperature index temperature is not less than a regeneration capability temperature, increasing the air-intake throttling.

2. The method according to claim 1, further comprising:
   performing, in parallel, the exhaust throttling and the air-intake throttling up to a maximum, and lowering an amount of fresh air intake.

3. An exhaust gas purification system provided with a catalyst regeneration control device for performing a regeneration control for a NOx purification catalyst, and being provided in an internal combustion engine mounted on a vehicle, comprising:
   the catalyst regeneration control device performing the regeneration control by performing, in parallel, a fuel system rich control, and an air-intake system rich control,
   the catalyst regeneration control device determines whether the vehicle is decelerating,
   when it is determined that the vehicle is not decelerating the regeneration control is not performed, when it is determined that the vehicle is decelerating, determining whether the regeneration control is necessary, and when it is determined that the vehicle is decelerating and the regeneration control is necessary, the regeneration control is performed, including air intake throttling and exhaust throttling; and a detector for detecting a NOx catalyst temperature index temperature, wherein, when it is determined that the vehicle is decelerating and if the detected NOx catalyst temperature index temperature is not less than a regeneration capability temperature, increasing the air-intake throttling.

4. An exhaust gas purification system for purifying an exhaust gas of an internal combustion engine mounted on a vehicle, comprising:

a NOx purification catalyst that purifies NOx when an air-fuel ratio of the exhaust gas is in a lean condition, and recovers NOx purification ability, when the air-fuel ratio is in a rich condition;

a catalyst regeneration control device for performing a regeneration control in which the exhaust gas is brought into a rich air-fuel ratio condition in order to recover the NOx purification ability of the NOx purification catalyst, wherein the catalyst regeneration control device performs the regeneration control by using, in parallel, a fuel system rich control, and an air-intake system rich control, wherein the air-intake system rich control includes an exhaust throttling and an air-intake throttling performed in parallel, and the catalyst regeneration control device lowers an amount of fresh air, and wherein, the catalyst regeneration control device determines whether the vehicle is decelerating, and when it is determined that the vehicle is not decelerating, the regeneration control is not performed, when it is determined that the vehicle is decelerating, determining whether the regeneration control is necessary, and when it is determined that the vehicle is decelerating and the regeneration control is necessary, the regeneration control is performed;

a detector for detecting a NOx catalyst temperature index temperature, wherein, when it is determined that the vehicle is decelerating and if the detected NOx catalyst temperature index temperature is not less than a regeneration capability temperature, increasing the air-intake throttling.

5. The exhaust gas purification system according to claim 4, wherein the NOx purification catalyst includes a NOx occlusion reduction-type catalyst that occludes NOx when the air-fuel ratio of the exhaust gas is in the lean condition, and releases and reduces the occluded NOx when the air-fuel ratio is in the rich condition, or alternatively, a NOx direct reduction-type catalyst that purifies the exhaust gas by reducing the NOx, when the air-fuel ratio of the exhaust gas is in the lean condition, and recovers the NOx purification ability when the air-fuel ratio is in the rich condition.

* * * * *